(12) United States Patent
Sridharan et al.

(10) Patent No.: US 12,314,709 B2
(45) Date of Patent: May 27, 2025

(54) METHOD AND SYSTEM FOR MAINTENANCE OF IMMUTABLE EVIDENCE FOR SOFTWARE DEVELOPMENT LIFE CYCLE DATA

(71) Applicant: JPMorgan Chase Bank, N.A., New York, NY (US)

(72) Inventors: Sandhya Sridharan, Los Altos, CA (US); Thangamani Kasi, Bangalore (IN); Karthick Selvaraj, Bangalore (IN); Kumaran Kamalakannan, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 224 days.

(21) Appl. No.: 18/090,962

(22) Filed: Dec. 29, 2022

(65) Prior Publication Data
US 2024/0160437 A1     May 16, 2024

(30) Foreign Application Priority Data
Nov. 16, 2022 (IN) .............................. 202211065620

(51) Int. Cl.
*H04L 9/40*        (2022.01)
*G06F 8/71*        (2018.01)
*H04L 9/00*        (2022.01)

(52) U.S. Cl.
CPC . *G06F 8/71* (2013.01); *H04L 9/50* (2022.05)

(58) Field of Classification Search
CPC ..... G06F 8/70; G06F 8/71; H04L 9/40; H04L 9/50

USPC .................................................. 713/189, 193
See application file for complete search history.

(56) References Cited

U.S. PATENT DOCUMENTS

| | | | | |
|---|---|---|---|---|
| 10,216,527 | B2* | 2/2019 | Whitney | G06F 8/71 |
| 11,720,688 | B2* | 8/2023 | Anton | H04L 9/3236 |
| | | | | 713/193 |
| 2018/0307904 | A1* | 10/2018 | Patil | G06F 40/30 |
| 2019/0303623 | A1* | 10/2019 | Reddy | H04L 9/50 |
| 2023/0261876 | A1* | 8/2023 | Kumar | G06F 8/71 |
| | | | | 713/168 |
| 2023/0376603 | A1* | 11/2023 | Yaron | G06F 8/71 |
| 2023/0418952 | A1* | 12/2023 | Das | G06F 21/577 |
| 2024/0046391 | A1* | 2/2024 | Ma | H04L 9/12 |

* cited by examiner

*Primary Examiner* — Bharat Barot
(74) *Attorney, Agent, or Firm* — GREENBLUM & BERNSTEIN, P.L.C.

(57) ABSTRACT

A method and a system for maintaining immutability of evidence that relates to software development life cycle data and that is protected from tampering in order to guarantee data integrity and consistency are provided. The method includes: receiving an evidence item that relates to a software development; encrypting the evidence item; storing the encrypted evidence item in a memory; computing a hash value based on the evidence item; and combining the hash value with a hash tree that relates to the software development. The hash tree includes a set of hash values for which there is a one-to-one correspondence with a set of evidence items that are represented in the hash tree. When tampering, such as content alteration or deletion, occurs with respect to an evidence item, the hash values in the hash tree may be used to determine the evidence item for which the tampering has occurred.

16 Claims, 7 Drawing Sheets

METHOD AND SYSTEM FOR MAINTENANCE OF IMMUTABLE EVIDENCE FOR SOFTWARE DEVELOPMENT LIFE CYCLE DATA

CROSS-REFERENCE TO RELATED APPLICATIONS

This application claims priority benefit from Indian Application No. 202211065620, filed Nov. 16, 2022, which is hereby incorporated by reference in its entirety.

BACKGROUND

1. Field of the Disclosure

This technology generally relates to methods and systems for providing and maintaining immutability of evidence that relates to software development life cycle data and that is protected from tampering in order to guarantee data integrity and consistency.

2. Background Information

The financial industry is highly regulated and continuously monitored to meet compliance and regulatory standards. These compliance and regulatory standards define the rules of financial software development and maintenance. As part of this, financial companies prepare and maintain change records of software during the development and maintenance phases.

The change records contain a variety of software development life cycle (SDLC) data that relate to the software being built or maintained. These change records are called evidences of the software, which are built by complying to regulatory standards. These evidences are stored in persistent systems for purposes of regulatory audits.

The key challenge is to maintain the evidences without tampering by humans or by other software. The system should guarantee data integrity and consistency, once an evidence is added to the evidence store. Conventionally, reliance has been placed upon controlling access to resources such as databases and application programming interfaces (APIs) of evidence stores in order to protect from tampering However, if a human or external/internal system has access to the evidence store, then they can alter the evidences, which is problematic.

Accordingly, there is a need for a method for providing and maintaining immutability of evidence that relates to software development life cycle data and that is protected from tampering in order to guarantee data integrity and consistency.

SUMMARY

The present disclosure, through one or more of its various aspects, embodiments, and/or specific features or sub-components, provides, inter alia, various systems, servers, devices, methods, media, programs, and platforms for providing and maintaining immutability of evidence that relates to software development life cycle data and that is protected from tampering in order to guarantee data integrity and consistency.

According to an aspect of the present disclosure, a method for maintaining immutability of evidence that relates to software development life cycle data is provided. The method is implemented by at least one processor. The method includes: receiving, by the at least one processor, a first evidence item that relates to a first software development; encrypting, by the at least one processor, the first evidence item; storing, by the at least one processor in a memory, the encrypted first evidence item; computing, by the at least one processor, a first hash value based on the first evidence item; and combining, by the at least one processor, the first hash value with a first hash tree that relates to the first software development. The first hash tree includes a plurality of hash values that has a one-to-one correspondence with a plurality of evidence items that are represented in the first hash tree.

The first evidence item may include at least one from among a life cycle data item and a metadata item.

The metadata item may include at least one from among information that relates to an identity of a party that has implemented a change with respect to the first software development and an identity of a party that has approved the change for deployment.

The first hash value may include a 128-bit hash value that is expressible as a 32-character hexadecimal string.

The first hash tree may include a Merkle tree that has a binary tree structure with a number of levels that corresponds to a lowest exponent value for which a respective power of two is greater than a number of the plurality of evidence items that are represented in the Merkle tree.

When tampering occurs with respect to at least one evidence item from among the plurality of evidence items, the method may further include determining the at least one evidence item for which the tampering has occurred based on the plurality of hash values.

The tampering may include at least one from among altering a content of the at least one evidence item and deleting the at least one evidence item.

The number of the plurality of evidence items represented in the Merkle tree may be greater than one million.

According to another exemplary embodiment, a computing apparatus for maintaining immutability of evidence that relates to software development life cycle (SDLC) data is provided. The computing apparatus includes a processor; a memory; and a communication interface coupled to each of the processor and the memory. The processor is configured to: receive, via the communication interface, a first evidence item that relates to a first software development; encrypt the first evidence item; store the encrypted first evidence item in the memory; compute a first hash value based on the first evidence item; and combine the first hash value with a first hash tree that relates to the first software development. The first hash tree includes a plurality of hash values that has a one-to-one correspondence with a plurality of evidence items that are represented in the first hash tree.

The first evidence item may include at least one from among a life cycle data item and a metadata item.

The metadata item may include at least one from among information that relates to an identity of a party that has implemented a change with respect to the first software development and an identity of a party that has approved the change for deployment.

The first hash value may include a 128-bit hash value that is expressible as a 32-character hexadecimal string.

The first hash tree may include a Merkle tree that has a binary tree structure with a number of levels that corresponds to a lowest exponent value for which a respective power of two is greater than a number of the plurality of evidence items that are represented in the Merkle tree.

When tampering occurs with respect to at least one evidence item from among the plurality of evidence items, the processor may be further configured to determine the at least one evidence item for which the tampering has occurred based on the plurality of hash values.

The tampering may include at least one from among altering a content of the at least one evidence item and deleting the at least one evidence item.

The number of the plurality of evidence items represented in the Merkle tree may be greater than one million.

According to yet another exemplary embodiment, a non-transitory computer readable storage medium storing instructions for maintaining immutability of evidence that relates to software development life cycle (SDLC) data is provided. The storage medium includes executable code which, when executed by a processor, causes the processor to: receive a first evidence item that relates to a first software development; encrypt the first evidence item; store the encrypted first evidence item in a memory; compute a first hash value based on the first evidence item; and combine the first hash value with a first hash tree that relates to the first software development. The first hash tree includes a plurality of hash values that has a one-to-one correspondence with a plurality of evidence items that are represented in the first hash tree.

The first evidence item may include at least one from among a life cycle data item and a metadata item.

The metadata item may include at least one from among information that relates to an identity of a party that has implemented a change with respect to the first software development and an identity of a party that has approved the change for deployment.

The first hash value may include a 128-bit hash value that is expressible as a 32-character hexadecimal string.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
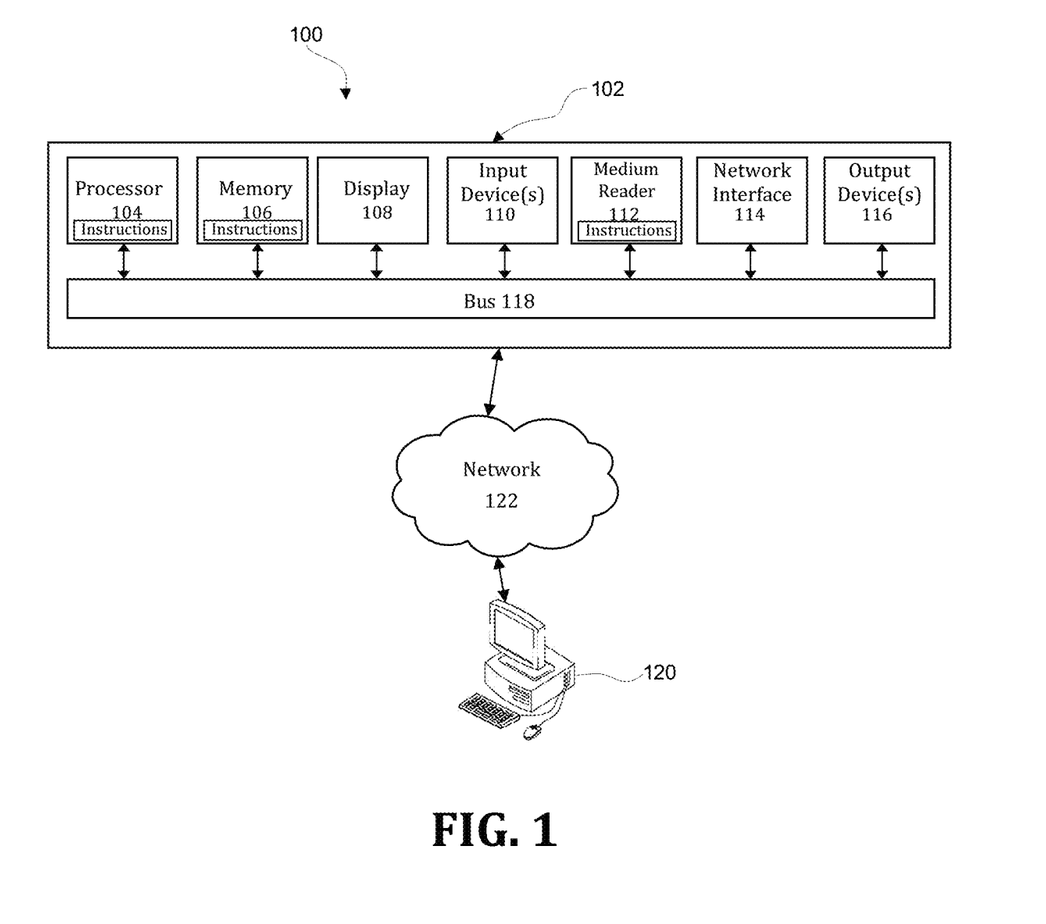
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing and maintaining immutability of evidence that relates to software development life cycle (SDLC) data and that is protected from tampering in order to guarantee data integrity and consistency.

Figure 2:
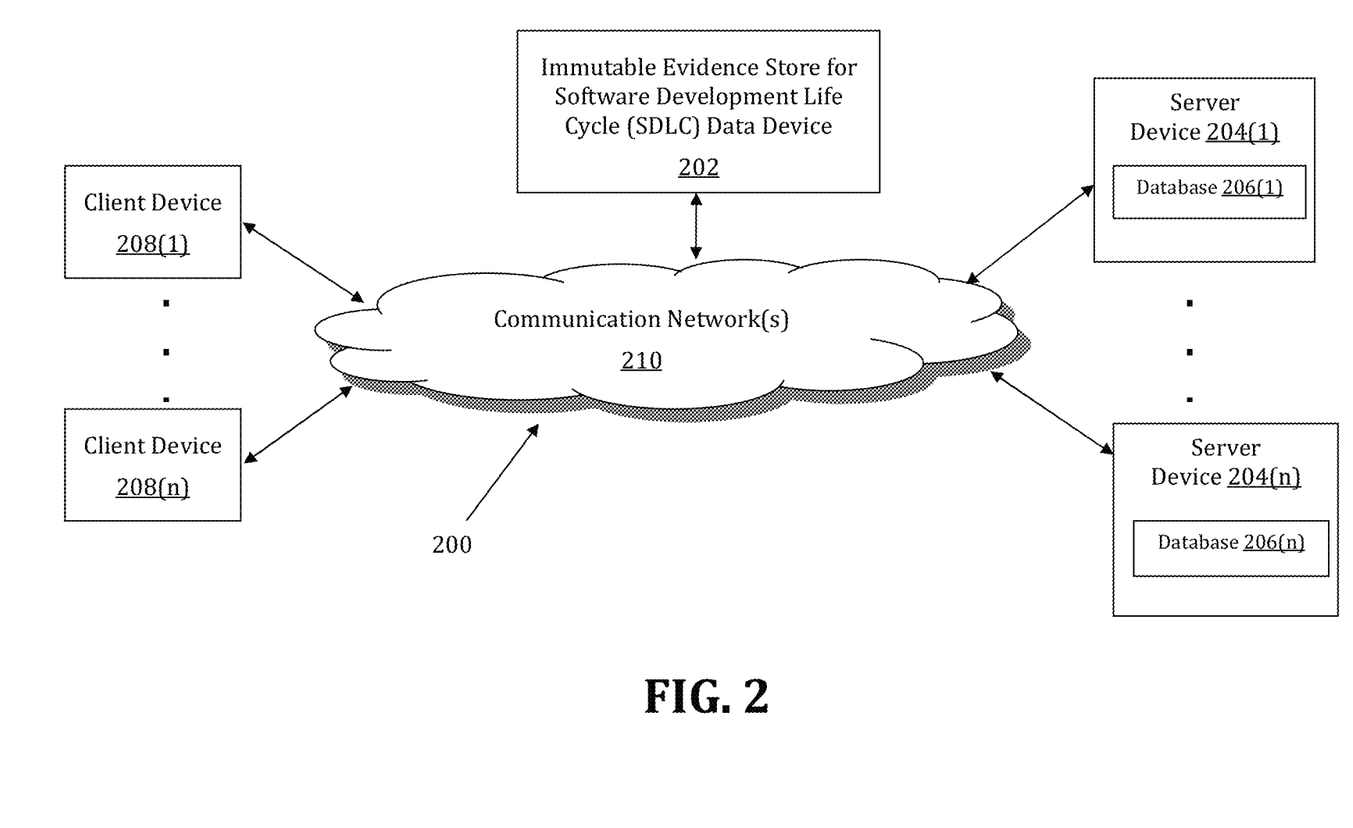
FIG. 2 illustrates an exemplary diagram of a network environment.

Referring to FIG. 2, a schematic of an exemplary network environment 200 for implementing a method for providing and maintaining immutability of evidence that relates to SDLC data and that is protected from tampering in order to guarantee data integrity and consistency is illustrated. In an exemplary embodiment, the method is executable on any networked computer platform, such as, for example, a personal computer (PC).

The method for providing and maintaining immutability of evidence that relates to SDLC data and that is protected from tampering in order to guarantee data integrity and consistency may be implemented by an Immutable Evidence Store for SDLC Data (IESSD) device 202. The IESSD device 202 may be the same or similar to the computer system 102 as described with respect to FIG. 1. The IESSD device 202 may store one or more applications that can include executable instructions that, when executed by the IESSD device 202, cause the IES SD device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the IESSD device 202 itself, may be located in virtual server(s) running in a cloud-based computing environment rather than being tied to one or more specific physical network computing devices. Also, the application(s) may be running in one or more virtual machines (VMs) executing on the IESSD device 202. Additionally, in one or more embodiments of this technology, virtual machine(s) running on the IESSD device 202 may be managed or supervised by a hypervisor.

In the network environment 200 of FIG. 2, the IESSD device 202 is coupled to a plurality of server devices 204(1)-204(n) that hosts a plurality of databases 206(1)-206(n), and also to a plurality of client devices 208(1)-208(n) via communication network(s) 210. A communication interface of the IESSD device 202, such as the network interface 114 of the computer system 102 of FIG. 1, operatively couples and communicates between the IESSD device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IESSD device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and IESSD devices that efficiently implement a method for providing and maintaining immutability of evidence that relates to SDLC data and that is protected from tampering in order to guarantee data integrity and consistency.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The IESSD device 202 may be a standalone device or integrated with one or more other devices or apparatuses, such as one or more of the server devices 204(1)-204(n), for example. In one particular example, the IESSD device 202 may include or be hosted by one of the server devices 204(1)-204(n), and other arrangements are also possible. Moreover, one or more of the devices of the IESSD device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the IESSD device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store evidence information that relates to SDLC data and hash tree data that relates to integrity of the evidences of the SDLC data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the IES SD device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the IESSD device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the IESSD device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the IESSD device 202, the server devices 204(1)-204(n), or the client devices 208(1)-208(n), for example, may be configured to operate as virtual instances on the same physical machine. In other words, one or more of the IESSD device 202, the server devices 204(1)-204(n), or the client devices 208(1)-208(n) may operate on the same physical device rather than as separate devices communicating through communication network(s) 210. Additionally, there may be more or fewer IESSD devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
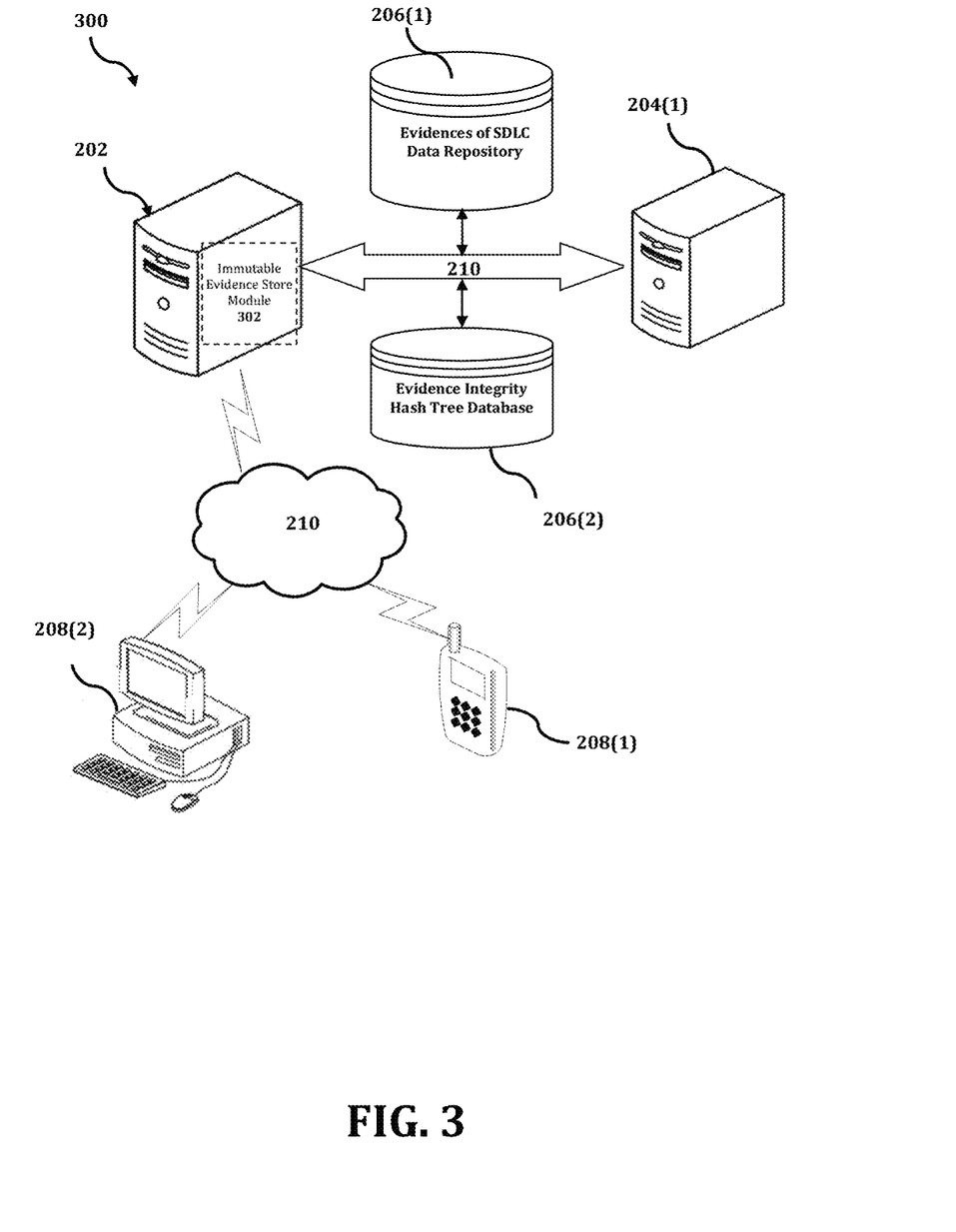
FIG. 3 shows an exemplary system for implementing a method for providing and maintaining immutability of evidence that relates to software development life cycle data and that is protected from tampering in order to guarantee data integrity and consistency.

The IESSD device 202 is described and illustrated in FIG. 3 as including an immutable evidence store module 302, although it may include other rules, policies, modules, databases, or applications, for example. As will be described below, the immutable evidence store module 302 is configured to implement a method for providing and maintaining immutability of evidence that relates to SDLC data and that is protected from tampering in order to guarantee data integrity and consistency.

An exemplary process 300 for implementing a mechanism for providing and maintaining immutability of evidence that relates to SDLC data and that is protected from tampering in order to guarantee data integrity and consistency by utilizing the network environment of FIG. 2 is illustrated as being executed in FIG. 3. Specifically, a first client device 208(1) and a second client device 208(2) are illustrated as being in communication with IESSD device 202. In this regard, the first client device 208(1) and the second client device 208(2) may be "clients" of the IESSD device 202 and are described herein as such. Nevertheless, it is to be known and understood that the first client device 208(1) and/or the second client device 208(2) need not necessarily be "clients" of the IESSD device 202, or any entity described in association therewith herein. Any additional or alternative relationship may exist between either or both of the first client device 208(1) and the second client device 208(2) and the IESSD device 202, or no relationship may exist.

Further, IESSD device 202 is illustrated as being able to access an evidences of SDLC data repository 206(1) and a evidence integrity hash tree database 206(2). The immutable evidence store module 302 may be configured to access these databases for implementing a method for providing and maintaining immutability of evidence that relates to SDLC data and that is protected from tampering in order to guarantee data integrity and consistency.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the IESSD device 202 via broadband or cellular communication. Of course, these embodiments are merely exemplary and are not limiting or exhaustive.

Upon being started, the immutable evidence store module 302 executes a process for providing and maintaining immutability of evidence that relates to SDLC data and that is protected from tampering in order to guarantee data integrity and consistency. An exemplary process for providing and maintaining immutability of evidence that relates to SDLC data and that is protected from tampering in order to guarantee data integrity and consistency is generally indicated at flowchart 400 in FIG. 4.

Figure 4:
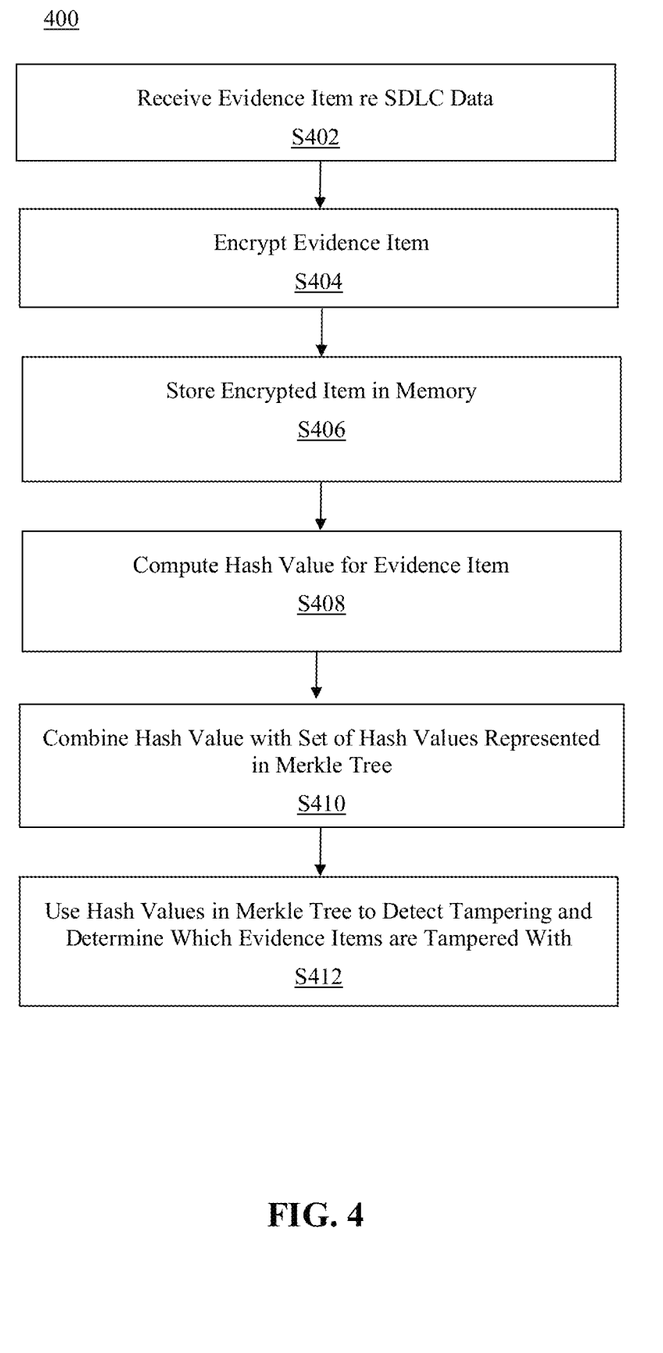
FIG. 4 is a flowchart of an exemplary process for implementing a method for providing and maintaining immutability of evidence that relates to software development life cycle data and that is protected from tampering in order to guarantee data integrity and consistency.

In process 400 of FIG. 4, at step S402, the immutable evidence store module 302 receives an evidence item that relates to a software development. In an exemplary embodiment, the evidence item includes any one or more of a software development life cycle (SDLC) data item and metadata item, such as, for example, an identity of a party that has implemented a change with respect to the software development and/or an identity of a party that has approved the change for deployment.

At step S404, the immutable evidence store module 302 encrypts the evidence item, and then, at step S406, the immutable evidence store module 302 stores the encrypted evidence item in a memory, such as, for example, evidences of SDLC data repository 206(1). In an exemplary embodiment, the encrypted evidence item may be stored in two different memories, one of which is intended for regular accessibility to users and software developers, and the other of which is intended as an immutable store that is accessible only when there is a confirmation that there is no tampering with the stored evidence items.

At step S408, the immutable evidence store module 302 computes a hash value based on the evidence item received in step S402. In an exemplary embodiment, the hash value comprises a 128-bit hash value that is expressible as a 32-character hexadecimal string.

At step S410, the immutable evidence store module 302 combines the hash value computed in step S408 with a hash tree that relates to the software development. The hash tree includes a set of hash values that has a one-to-one correspondence with a set of evidence items that are represented therein. In an exemplary embodiment, the hash tree is a Merkle tree that has a binary tree structure with a number of levels that corresponds to a lowest exponent value for which a respective power of two is greater than or equal to a number of the evidence items that are represented in the Merkle tree. Thus, for example, if x=the number of evidence items that are represented in the Merkle tree, and the number of levels in the Merkle tree is N, then $2^{N-1}<x\leq 2^N$. In an exemplary embodiment, the number of evidence items represented in the Merkle tree may exceed one million (i.e., x≥1,000,000).

At step S412, when tampering occurs with respect to at least one of the evidence items that is represented in the Merkle tree, the immutable evidence store module 302 uses the hash values in the Merkle tree to detect the tampering and to determine which evidence item(s) have been tampered with. In an exemplary embodiment, the tampering may be caused by either or both of altering a content of a particular evidence item and/or deleting a particular evidence item. When such tampering occurs, the corresponding hash value for the tampered-with evidence item will be different, and this will automatically cause an occurrence of a variation in all hash values that are computed based on the tampered-with evidence item.

In an exemplary embodiment, an evidence item is a piece of data that contains and/or relates to certain SDLC data, such as a scan report, a test report, an approval for deployment, a code repository, changeset details, and/or any other suitable type of data that relates to a software development life cycle. As part of a software development process, the modified code goes through several stages, including a planning stage, a coding stage, a build stage, a security scan stage, a testing stage, and a deployment stage. In each stage, evidence is generated and collected and then persisted in an evidence store.

Generally, there may be many actors who interact with the evidence store. Some actors are normal users, and some others are relatively powerful users who are managing the evidence store services. In this regard, one may alter evidence via a back door, i.e., by accessing a database or other mutual application programming interfaces (APIs) which are not intended for normal users, or by exploiting a software bug. This phenomenon gives rise to a need for an open secure system that enables the evidence store to tolerate and recover from such incidents of tampering and/or data corruption.

In an exemplary embodiment, an objective is to provide immutability for the evidence records created and stored in the evidence store. In case of tampering, the system and editing of the evidence records would be easily cross-checked, and restoration of the original payload would then be performed. In order to achieve these two aspects, tamper-proof methods and algorithms are required to secure the system from the undesirable activities.

In an exemplary embodiment, an immutable evidence store is a combination of various running processes and an encrypted disk that is remotely deployed. Every new evidence item that is written to an existing evidence store generates a change data capture event, and then the new evidence item is forwarded to the immutable evidence store. The immutable store processes the incoming payload and encrypts it, and then stores the encrypted evidence item in another memory, where it is generally not accessible to anyone. In this aspect, even if the evidence items in the immutable store are accessed, the entire content thereof is in an encrypted format.

In an exemplary embodiment, the immutable evidence store computes a hash value of the incoming evidence payload and stores the newly computed hash value in a hash tree, which is an implementation of a Merle tree. This hash tree is maintained for each table in the evidence store, where each table corresponds to a particular software development.

Typically, in order to verify data integrity of the evidence store, every record in the evidence store would need to be compared and verified with the duplicate copy thereof that is stored in the remote cluster. However, it is very difficult to transfer the contents within the network, and it is also difficult to check whether the contents of a particular evidence item are the same or have been altered. This is not a scalable solution, because as the evidence store grows, it may soon have a large number of evidence records, i.e., in the millions or billions. Comparing each record against another copy in a remote cluster is a tedious process and is resource intensive. In addition, such an integrity check must happen relatively frequently, in order to ensure that the entire evidence store retains data integrity. Still further, in the immutable store, the evidence payload is not persisted in plain text format; instead, it is stored as an encrypted file, and therefore, an integrity check would also require decryption of each and every such item, which is also time consuming and relatively expensive.

In an exemplary embodiment, the Merkle tree is a data structure that is represented as a binary tree, and it is useful because it summarizes a short form of the data in a larger data set. In a hash tree, the leaves are the data blocks, which correspond to files in a file system. Every parent node in the hash tree is a hash value of its direct child node, which tightly compacts the summary. A Merkle tree represents an interesting application of such hash functions, as it represents a series of parallel-computed hash values that feed into a cryptographically robust resultant hash value of the entire tree. Corruption or integrity loss of any one of the hash values, or of any data elements that have been hashed, provides an indication that integrity was lost at a given point in the Merkle tree. A Merkle tree is a complete binary tree constructed from evidence records, where each internal node of the tree is a concatenation and then a hash of its left child and its right child.

Figure 5:
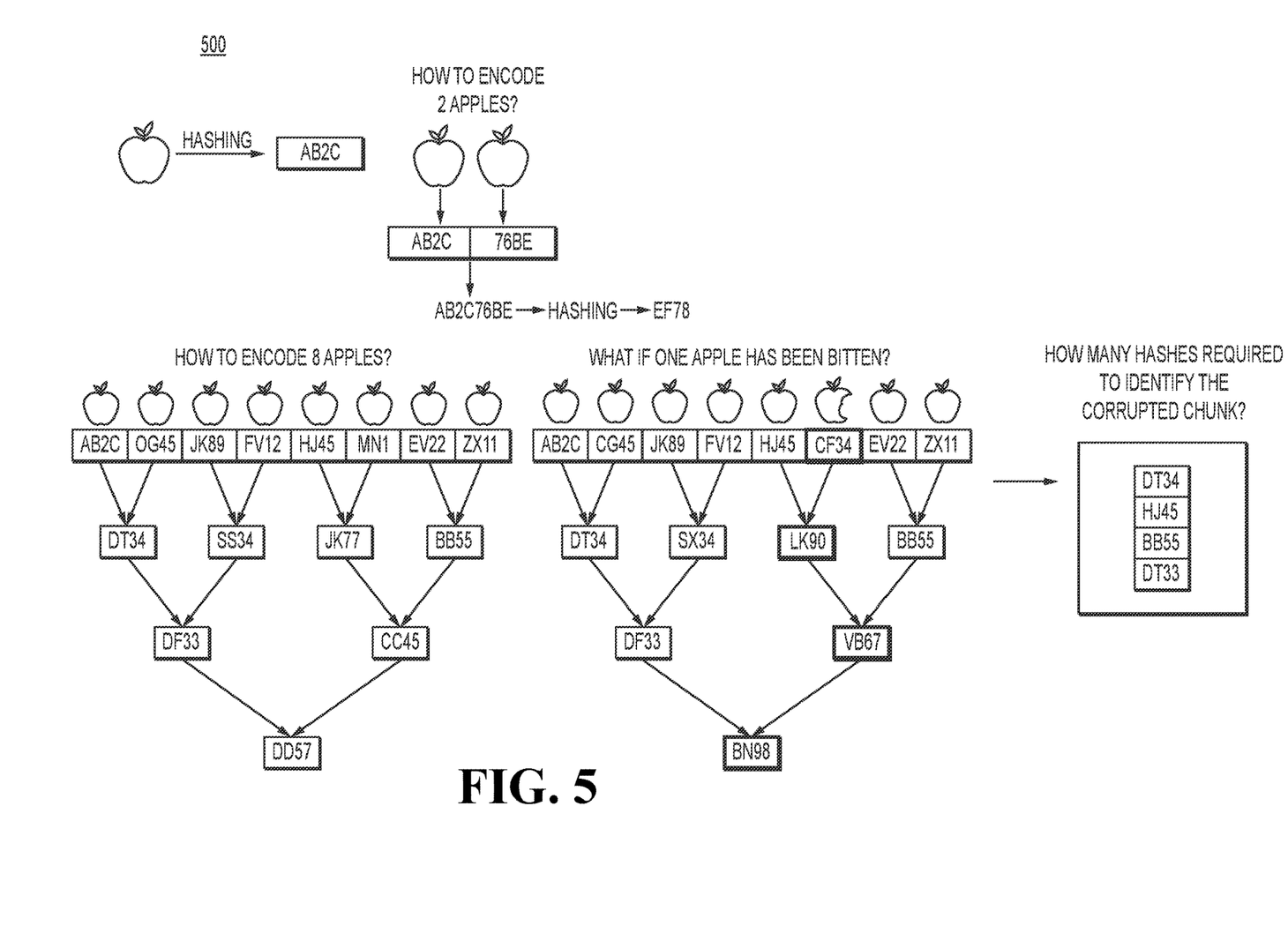
FIG. 5 is a diagram that illustrates a Merkle tree that includes a set of hash values that are usable for detecting tampering of evidence items in a system for providing and maintaining immutability of evidence that relates to software development life cycle data and that is protected from tampering in order to guarantee data integrity and consistency, according to an exemplary embodiment.

FIG. 5 is a diagram 500 that illustrates a Merkle tree that includes a set of hash values that are usable for detecting tampering of evidence items in a system for providing and maintaining immutability of evidence that relates to software development life cycle data and that is protected from tampering in order to guarantee data integrity and consistency, according to an exemplary embodiment.

As illustrated in FIG. 5, an apple represents a single evidence item, for which a 128-bit hash value is computed as a 32-character hexadecimal string. Then, a particular pair of hash values may be hashed together in order to compute a new parent hash value for particular pair. Thus, if there are eight (8) evidence items in the hash tree, these correspond to 8 different hash values at a top level, which may be pairwise combined in order to generate four (4) hash values that reside at a second level. These 4 hash values may also be pairwise combined in order to generate two (2) hash values that reside at a third level, and these 2 hash values may be combined in order to generate a single root-level hash value.

As also illustrated in FIG. 5, when a single evidence item is tampered with or corrupted, this causes several of the hash values to be different than those of the original hash tree. In particular, in a scenario where the sixth evidence item is corrupted but the other seven items are not corrupted, the root-level hash value is different, thereby indicating that at least one item has been tampered with. At the third level, the hash value on the left is not different, but the hash value on the right is different, thereby indicating that the first, second, third, and fourth evidence items have not been tampered with, but at least one of the fifth, sixth, seventh, and eighth evidence items has been tampered with. Then, at the second level, the only hash value that is different is the third of the four, thereby indicating that either the fifth evidence item or the sixth evidence item has been tampered with. Finally, at the top level, the only hash value that is different is the fifth of the eight, thereby indicating that tampering has occurred with respect to the fifth evidence item, and as also illustrated by the apple that has been bitten.

Figure 6:
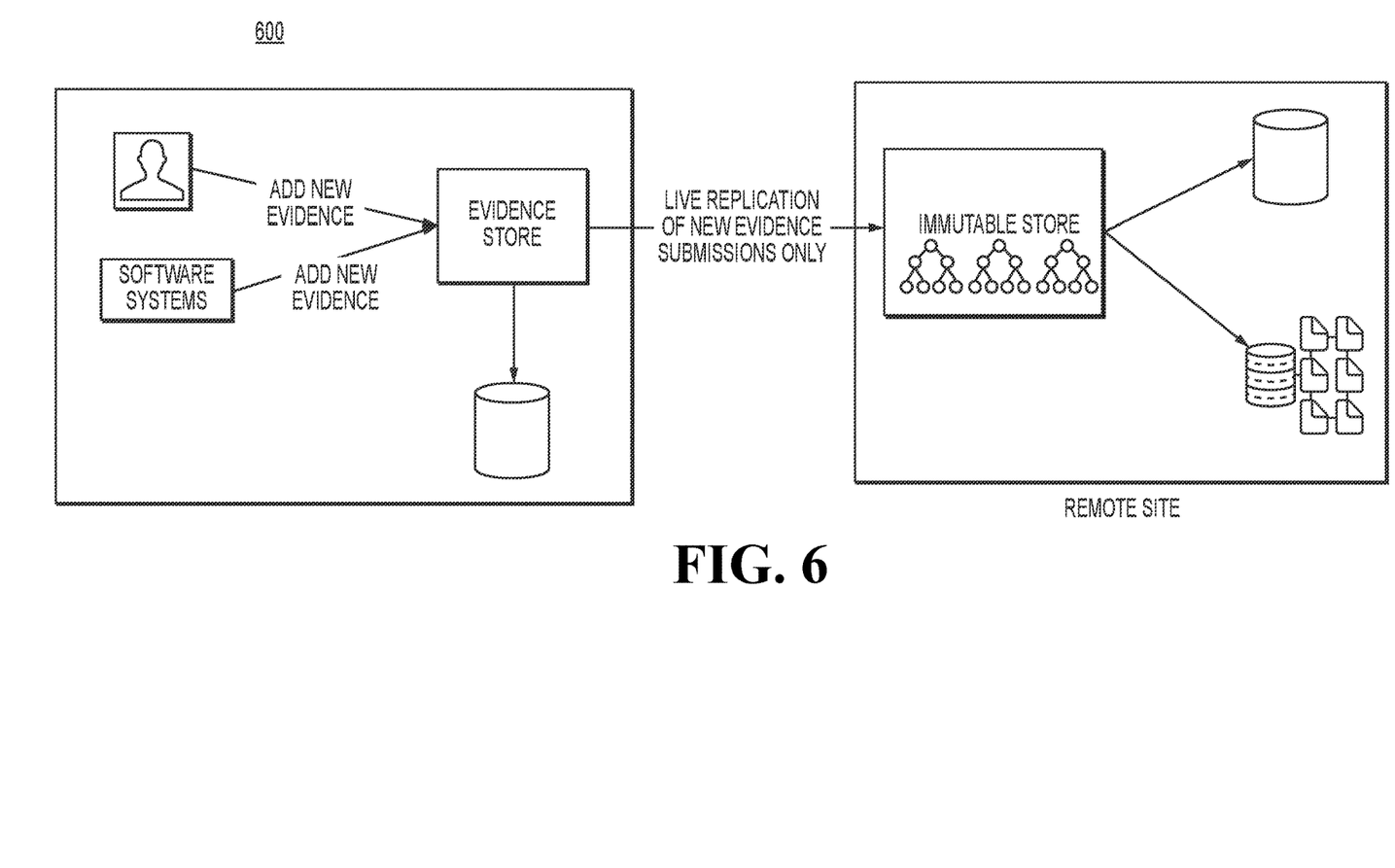
FIG. 6 is a block diagram that illustrates a data flow in a system for providing and maintaining immutability of evidence that relates to software development life cycle data and that is protected from tampering in order to guarantee data integrity and consistency, according to an exemplary embodiment.

FIG. 6 is a block diagram 600 that illustrates a data flow in a system for providing and maintaining immutability of evidence that relates to software development life cycle data and that is protected from tampering in order to guarantee data integrity and consistency, according to an exemplary embodiment.

Referring to FIG. 6, in an exemplary embodiment, an immutable store is a group of services that are deployed together to maintain several Merkle trees of evidence tables (i.e., one tree per table, which corresponds to one tree per software development), and stores the actual evidence records in an encrypted format. The immutable store is able to select a particular evidence item by using the evidence metadata upon request. The evidence store works closely together with the immutable store to ensure that data integrity is always protected. Every evidence submission in the evidence store is replicated to the immutable store, which is located at a remote site, and at which the evidence data is encrypted and stored. In addition, the hash tree is built and maintained in the immutable store, and the hash tree is persisted in a database as an adjacency list.

In an exemplary embodiment, the evidence store periodically checks the data integrity of the evidence records by computing hash values that correspond to the records and building a complete Merkle tree in memory. Once the tree is ready, the evidence store can send selected hash values to the determine the data integrity by comparing the selected hash values with the Merkle tree maintained by the immutable store.

Figure 7:
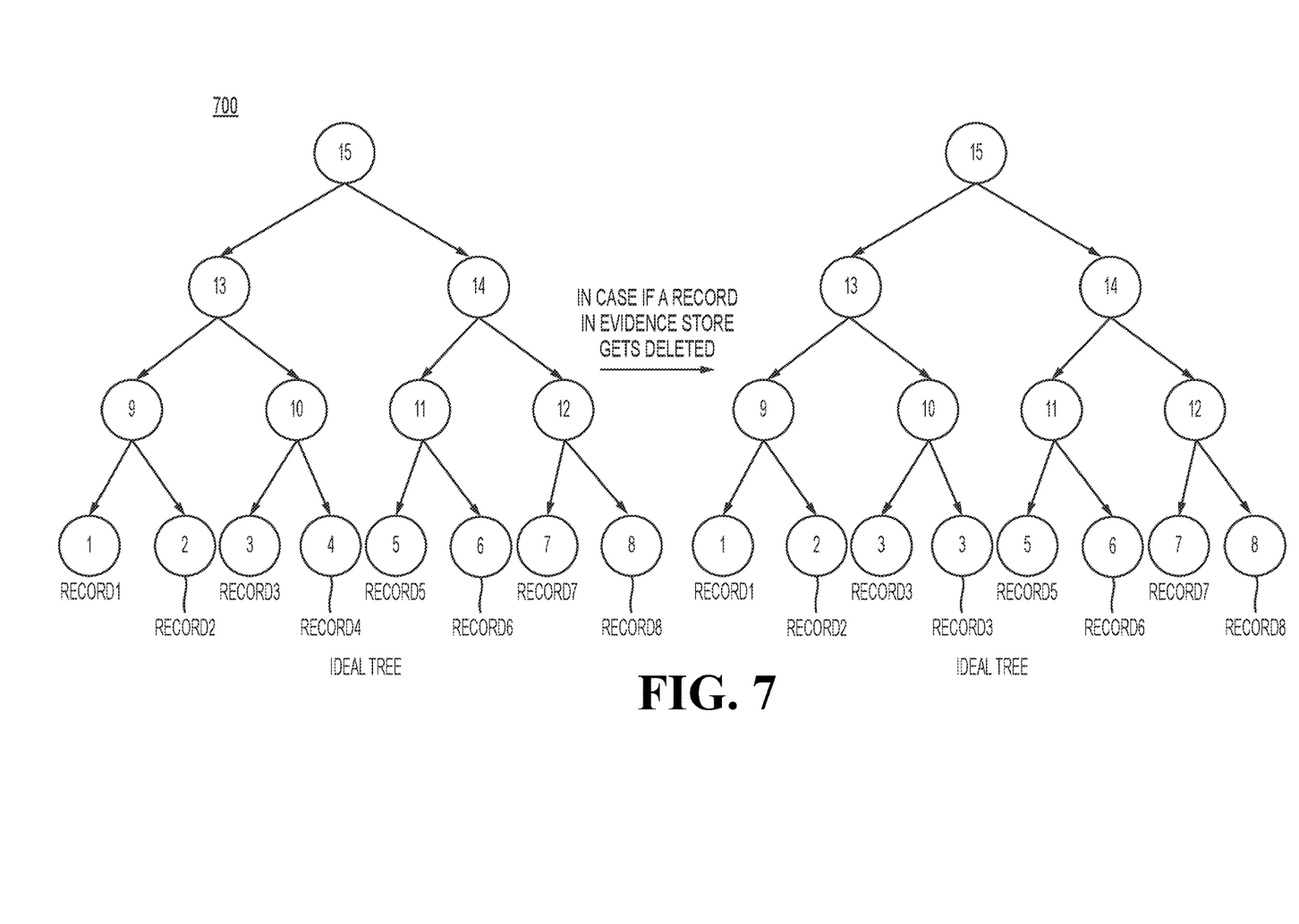
FIG. 7 is a tree diagram that illustrates a situation in which an evidence item is tampered with so as to be detectable by a system for providing and maintaining immutability of evidence that relates to software development life cycle data and that is protected from tampering in order to guarantee data integrity and consistency, according to an exemplary embodiment.

FIG. 7 is a tree diagram 700 that illustrates a situation in which an evidence item is tampered with so as to be detectable by a system for providing and maintaining immutability of evidence that relates to software development life cycle data and that is protected from tampering in order to guarantee data integrity and consistency, according to an exemplary embodiment.

As illustrated in FIG. 7, in order to compute a hash tree for 8 records, a tree of height 3 is needed. The total number of nodes required to construct the full binary tree is equal to $2^{h+1}-1$, where h=the height of the tree, and so for 8 records, h=3 and the total number of nodes is fifteen (15). Similarly, if the total number of evidence records is one million, then the tree height h=20; if the total number of evidence records is one billion, then the tree height h=30; and if the total number of evidence records is 4 billion, then h=32.

Referring again to FIG. 7, once the evidence store has constructed the hash tree with the records retrieved in a particular order by sequence number, the following logic is usable for verifying the data integrity check for the entire range of records. The run time, as compared with individually checking each record, is reduced to log(N) base 2, where N is the total number of records.

First, the evidence store sends the root hash value (labeled as node #15) to the immutable store. If both root hash values are equal, then none of the evidence items that correspond to that particular software development have been tampered with.

Second: If the root hash values are not equal, then the evidence store sends the hash values of node #13 and node #14 to the immutable store. When one of those hash values does not match, then continue along that path. As illustrated in FIG. 7, the hash value of node #14 would match, but the hash value of node #13 would not match, and so the evidence store sends the hash values of node #9 and node #10, which are the child nodes associated with node #13. The hash value of node #9 would match but the hash value of node #10 would match, and so the evidence store sends the hash values of node #3 and node #4.

Third: When the hash values of node #3 match but those of node #4 do not match, a determination is made that the evidence item associated with node #4 has been tampered with and/or corrupted. Once the exact records that have been modified at the evidence store are identified, an alarm is generated to notify interested parties that tampering has occurred with respect to particular evidence items. As a result, the correct evidence records may be automatically restored from the remote site, and/or human intervention may occur in order to take action to counteract the tampering and to restore the original information.

Further optimization to process records in batches of 1024 multiples may also be achieved, as follows: Each evidence record has an integer to represent its identification, which is assigned according to a one-up positive integer sequence.

This allows the evidence to be split into batches of 1024 records before computing the corresponding hash values. As a result, the tree height may be reduced to 20 even when the number of evidence records is equal to one billion. This results in an approximate memory requirement of 22 MB for an entire Merkle tree for one billion records.

In order to optimize the overall tree construction as described above, the leaf nodes are bucketized into groups of 1024 records before calculating a hash value. Thus, each leaf node would denote a single hash value of a maximum of 1024 records. In this scenario, for a maximum of 32768 records, there would be 32 buckets of leaf nodes, and the result would be an ability to identify a bucket of 1024 within which tampering has occurred. In an exemplary embodiment, a new Merkle tree for just the items of this bucket may be used to identify the specific item(s) for which tampering has occurred.

Accordingly, with this technology, an optimized process for providing and maintaining immutability of evidence that relates to SDLC data and that is protected from tampering in order to guarantee data integrity and consistency is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for maintaining immutability of evidence that relates to software development life cycle (SDLC) data, the method being implemented by at least one processor, the method comprising:
receiving, by the at least one processor, a first evidence item that relates to a first software development;
encrypting, by the at least one processor, the first evidence item;
storing, by the at least one processor in a memory, the encrypted first evidence item;
computing, by the at least one processor, a first hash value based on the first evidence item; and
combining, by the at least one processor, the first hash value with a first hash tree that relates to the first software development,
wherein the first hash tree includes a plurality of hash values that has a one-to-one correspondence with a plurality of evidence items that are represented in the first hash tree, and
wherein the first hash tree comprises a Merkle tree that has a binary tree structure with a number of levels that corresponds to a lowest exponent value for which a respective power of two is greater than a number of the plurality of evidence items that are represented in the Merkle tree, and
wherein when tampering occurs with respect to at least one evidence item from among the plurality of evidence items, the method further comprises determining the at least one evidence item for which the tampering has occurred based on the plurality of hash values.

2. The method of claim 1, wherein the first evidence item comprises at least one from among a life cycle data item and a metadata item.

3. The method of claim 2, wherein the metadata item comprises at least one from among information that relates to an identity of a party that has implemented a change with respect to the first software development and an identity of a party that has approved the change for deployment.

4. The method of claim 1, wherein the first hash value comprises a 128-bit hash value that is expressible as a 32-character hexadecimal string.

5. The method of claim 1, wherein the tampering comprises at least one from among altering a content of the at least one evidence item and deleting the at least one evidence item.

6. The method of claim 1, wherein the number of the plurality of evidence items represented in the Merkle tree is greater than one million.

7. A computing apparatus for maintaining immutability of evidence that relates to software development life cycle (SDLC) data, the computing apparatus comprising:
a processor;
a memory; and
a communication interface coupled to each of the processor and the memory,
wherein the processor is configured to:
receive, via the communication interface, a first evidence item that relates to a first software development;
encrypt the first evidence item;
store the encrypted first evidence item in the memory;
compute a first hash value based on the first evidence item; and
combine the first hash value with a first hash tree that relates to the first software development,
wherein the first hash tree includes a plurality of hash values that has a one-to-one correspondence with a plurality of evidence items that are represented in the first hash tree, and
wherein the first hash tree comprises a Merkle tree that has a binary tree structure with a number of levels that corresponds to a lowest exponent value for which a respective power of two is greater than a number of the plurality of evidence items that are represented in the Merkle tree, and
wherein when tampering occurs with respect to at least one evidence item from among the plurality of evidence items, the processor is further configured to determine the at least one evidence item for which the tampering has occurred based on the plurality of hash values.

8. The computing apparatus of claim 7, wherein the first evidence item comprises at least one from among a life cycle data item and a metadata item.

9. The computing apparatus of claim 8, wherein the metadata item comprises at least one from among information that relates to an identity of a party that has implemented a change with respect to the first software development and an identity of a party that has approved the change for deployment.

10. The computing apparatus of claim 7, wherein the first hash value comprises a 128-bit hash value that is expressible as a 32-character hexadecimal string.

11. The computing apparatus of claim 7, wherein the tampering comprises at least one from among altering a content of the at least one evidence item and deleting the at least one evidence item.

12. The computing apparatus of claim 7, wherein the number of the plurality of evidence items represented in the Merkle tree is greater than one million.

13. A non-transitory computer readable storage medium storing instructions for maintaining immutability of evidence that relates to software development life cycle (SDLC) data, the storage medium comprising executable code which, when executed by a processor, causes the processor to:
receive a first evidence item that relates to a first software development;
encrypt the first evidence item;
store the encrypted first evidence item in a memory;
compute a first hash value based on the first evidence item; and
combine the first hash value with a first hash tree that relates to the first software development,
wherein the first hash tree includes a plurality of hash values that has a one-to-one correspondence with a plurality of evidence items that are represented in the first hash tree, and
wherein the first hash tree comprises a Merkle tree that has a binary tree structure with a number of levels that corresponds to a lowest exponent value for which a respective power of two is greater than a number of the plurality of evidence items that are represented in the Merkle tree, and
wherein when tampering occurs with respect to at least one evidence item from among the plurality of evidence items, the executable code further causes the processor to determine the at least one evidence item for which the tampering has occurred based on the plurality of hash values.

14. The storage medium of claim 13, wherein the first evidence item comprises at least one from among a life cycle data item and a metadata item.

15. The storage medium of claim 14, wherein the metadata item comprises at least one from among information that relates to an identity of a party that has implemented a change with respect to the first software development and an identity of a party that has approved the change for deployment.

16. The storage medium of claim 13, wherein the first hash value comprises a 128-bit hash value that is expressible as a 32-character hexadecimal string.

* * * * *